United States Patent
Braunisch et al.

(10) Patent No.: US 11,108,433 B2
(45) Date of Patent: Aug. 31, 2021

(54) SINGLE SIDE BAND TRANSMISSION OVER A WAVEGUIDE

(71) Applicant: Intel Corporation, Santa Clara, CA (US)

(72) Inventors: Henning Braunisch, Phoenix, AZ (US); Georgios Dogiamis, Chandler, AZ (US); Jeff C. Morriss, Los Gatos, CA (US); Hyung-Jin Lee, Portland, OR (US); Richard Dischler, Bolton, MA (US); Ajay Balankutty, Hillsboro, OR (US); Telesphor Kamgaing, Chandler, AZ (US); Said Rami, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/206,919

(22) Filed: Nov. 30, 2018

(65) Prior Publication Data

US 2019/0115951 A1 Apr. 18, 2019

(51) Int. Cl.
*H04B 3/52* (2006.01)
*H04L 27/36* (2006.01)

(52) U.S. Cl.
CPC ............ *H04B 3/52* (2013.01); *H04L 27/362* (2013.01)

(58) Field of Classification Search
CPC ................................ H04B 3/52; H04L 27/362
See application file for complete search history.

(56) References Cited

U.S. PATENT DOCUMENTS

| 5,107,231 | A * | 4/1992 | Knox | H01P 5/1022 333/109 |
| 5,291,289 | A * | 3/1994 | Hulyalkar | H04L 5/0007 348/723 |
| 5,507,017 | A * | 4/1996 | Whitmarsh | H03D 7/168 330/291 |
| 8,229,352 | B2 * | 7/2012 | Doan | H03J 1/005 455/120 |
| 9,680,675 | B1 * | 6/2017 | Alderrou | H04L 27/01 |
| 10,009,067 | B2 * | 6/2018 | Birk | H02J 13/002 |
| 10,162,049 | B2 * | 12/2018 | Hakobyan | G01S 13/584 |
| 2003/0224801 | A1 * | 12/2003 | Lovberg | H01Q 1/125 455/454 |
| 2006/0264210 | A1 * | 11/2006 | Lovberg | H04W 92/20 455/422.1 |

(Continued)

OTHER PUBLICATIONS

Capmany, J., et al., "Multiwavelength Optical SSB Generation for Dispersion Mitigation in WDM Fibre Radio Systems Using AWG Multiplexer," Electronics Letters, vol. 38, No. 20, Sep. 26, 2002; 3 pages.

(Continued)

*Primary Examiner* — Jean B Corrielus
(74) *Attorney, Agent, or Firm* — Patent Capital Group

(57) ABSTRACT

Embodiments herein may relate to an interconnect that includes a transceiver, wherein the transceiver is configured to generate a single side band (SSB) signal for communication over a waveguide and a waveguide interconnect to communicate the SSB signal over the waveguide. In an example, an SSB operator is configured to generate the SSB signal and the SSB signal can be generated by use of a finite-impulse response filter. Other embodiments may be described and/or claimed.

14 Claims, 10 Drawing Sheets

(56) References Cited

U.S. PATENT DOCUMENTS

| | | | | |
|---|---|---|---|---|
| 2008/0002652 A1* | 1/2008 | Gupta | H01Q 1/2291 | 370/338 |
| 2009/0327384 A1* | 12/2009 | Petrovic | H04B 1/036 | 708/300 |
| 2010/0246710 A1* | 9/2010 | Nanri | H04L 25/03828 | 375/295 |
| 2011/0084879 A1* | 4/2011 | Brown | H01Q 3/2647 | 342/370 |
| 2013/0010851 A1* | 1/2013 | Jaeger | H04L 27/04 | 375/224 |
| 2014/0140379 A1* | 5/2014 | Teplitsky | H04L 27/364 | 375/219 |
| 2014/0153929 A1* | 6/2014 | Sun | H04B 10/5165 | 398/115 |
| 2015/0130658 A1* | 5/2015 | Hennegan | G01S 7/032 | 342/175 |
| 2015/0200727 A1* | 7/2015 | Stiffler | H04B 10/5165 | 398/115 |
| 2017/0063412 A1* | 3/2017 | Ripley | H04B 1/036 | |
| 2017/0207952 A1* | 7/2017 | Ogawa | H04L 41/0677 | |

OTHER PUBLICATIONS

Dolatsha, Nemat, et al., "Loss and Dispersion Limitations in mm-Wave Dielectric Waveguides for High-Speed Links," THz Letters, IEEE Transactions on Terahertz Science and Technology, vol. 6, No. 4, Jul. 2016; 4 pages.

Fuster, J.M., et al., "Chromatic Dispersion Effects in Electro-Optical Upconverted Millimetre-wave Fibre Optic Links," Electronics Letters, vol. 33, No. 23, Nov. 6, 1997; 2 pages.

Lee, J.Y., "Future of High-Speed Short-Reach Interconnects Using Clad-dielectric Waveguide," Proc. SPIE 10109, Optical Interconnects XVII, 1010903 (Feb. 20, 2017); doi:10.1117/12.2249252; 11 pages.

Schmuck, H., "Comparison of Optical Millimetre-wave System Concepts with Regard to Chromatic Dispersion," Electronics Letters, vol. 31, No. 21, Oct. 12, 1995; 2 pages.

Song, Ha Il, et al., "Plastic Straw: Future of High-Speed Signaling," Scientific Reports, published Nov. 3, 2015, Supplementary Information accompanies the paper at http://www.nature.com/srep (Supplemental Info included); 28 pages.

Weaver, Jr., Donald K., "A Third Method of Generation and Detection of Single-Sideband Signals," Proceedings of the IRE, vol. 44, Issue: 12, Dec. 1956; 3 pages.

* cited by examiner

SINGLE SIDE BAND TRANSMISSION OVER A WAVEGUIDE

FIELD

Embodiments of the present disclosure generally relate to the field of waveguides.

BACKGROUND

Emerging network trends in data centers and cloud systems place increasing performance demands on a system. For example, the ever-increasing demand for bandwidth triggered by mobile and video Internet traffic requires advanced interconnect solutions. Depending upon the frequencies, power levels, and physical requirements, waveguide interconnects are often used for high power RF and microwave applications. A waveguide is a structure that guides waves and as used herein, the term "waveguide" refers to any linear structure that conveys electromagnetic waves between endpoints. The dimensions of the waveguide determine which wavelengths it can support, and in which modes. Typically, the waveguide is operated so that only a single mode is present. The lowest order mode possible is generally selected. Frequencies below the waveguides cutoff frequency will not propagate.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
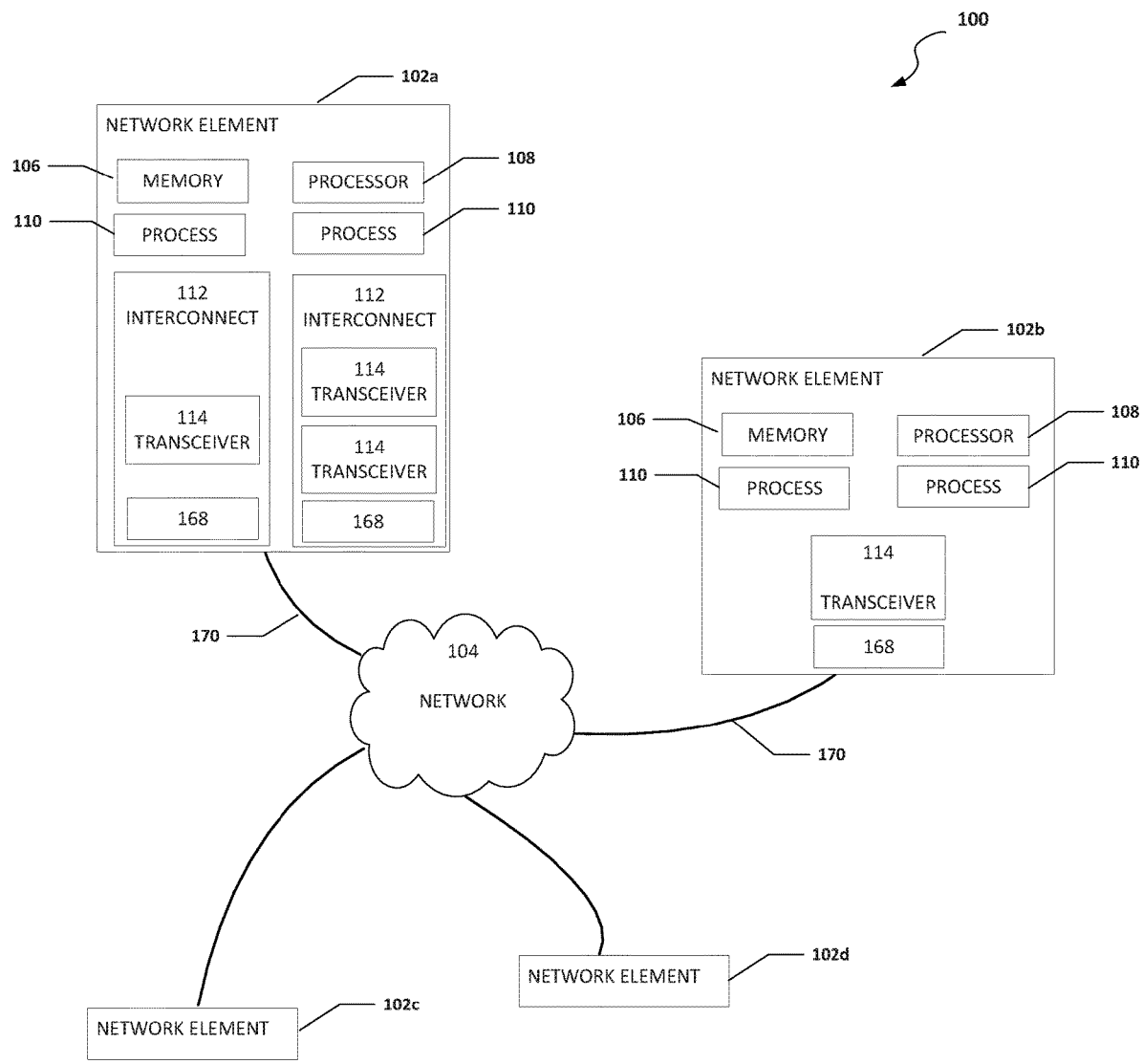
FIG. 1 illustrates an example system that may use a single side band transmission over a waveguide, in accordance with various embodiments.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to a system for enabling a single side band transmission over a waveguide in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent. As used herein, the term "block" and "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In addition, term "block" can refer to an engine (e.g., a Hilbert transform block can be a Hilbert transform engine).

FIG. 1 is a block diagram of a system 100 to enable single side band (SSB) millimeter (mm) wave transmission over a waveguide, in accordance with an embodiment of the present disclosure. A mm wave, sometimes referred to as an extremely high frequency (EHF) wave or a very high frequency (VHF) wave, is defined as having a frequency between about 30 gigahertz (GHz) to about 300 GHz. System 100 can include one or more network elements 102a-102d. Each network element 102a-102d can be in communication with each other using network 104. In an example, network elements 102a-102d can be in communication with each other using a waveguide 170. In some examples, network elements 102a-102d and network 104 are part of a data center.

Each network element 102a-102d can include memory, a processor, and one or more interconnects. For example, network elements 102a and 102b can include memory 106, a processor 108, and one or more interconnects 112. Each interconnect 112 can include one or more transceivers 114 and a waveguide interconnect 168 for communication over waveguide 170. In some examples, the network element may not include an interconnect or a transceiver may not be part of an interconnect (e.g., network element 102b does not include interconnect 112 but does include transceiver 114 and waveguide interconnect 168). Transceiver 114 and waveguide interconnect 168 may be part of a server or server blade. Each process 110 may be a process, application, function, virtual network function (VNF), etc. Waveguide 170 can be an uncladded dielectric, a dielectric with a conductive cladding surrounding the dielectric, or a dielectric with a conductive cladding surrounding the dielectric and containing a conductor.

In an illustrative example, system 100 can include a transceiver frontend for mm-wave or THz waveguide interconnects based on SSB modulation (lower side band (LSB) or upper side band (USB) modulation), lowpass filtering in the baseband, equalization, coherent phase shift keying (PSK)-pulse amplitude modulation (PAM), frequency division multiplexing (FDM), and optionally forward-error-correction (FEC). The SSB modulation can be achieved using a Hilbert quadrature modulation (phasing method), by filtering out the undesired sideband at RF or IF, by using a Weaver architecture, or other means of creating an SSB modulated signal. Lowpass filtering in the baseband can be achieved through the insertion of a lowpass filter, pulse shaping and/or slew rate control in the transmitter (TX), and/or propagation through a length of lossy channel such as a single-ended interconnect, differential interconnect, microstrip, strip line, co-planar waveguide, etc. Equalization can be achieved by using a continuous-time linear equalizer (CTLE), feed-forward equalizer (FFE), decision feedback equalizer (DFE), etc.

End users have more media and communications choices than ever before. A number of prominent technological trends are currently afoot (e.g., more computing devices, more online video services, more Internet traffic), and these trends are changing the media delivery landscape. Data centers serve a large fraction of the Internet content today, including web objects (text, graphics, Uniform Resource Locators (URLs) and scripts), downloadable objects (media files, software, documents), applications (e-commerce, portals), live streaming media, on demand streaming media, and social networks. In addition, devices and systems, such as data centers, are expected to increase performance and function. However, the increase in performance and/or function can cause bottlenecks within the resources of the data center and electronic devices in the data center.

As a result of the increased need for higher bandwidth, mm-wave and THz waveguide interconnects are being considered as a possible alternative to electrical and optical interconnects in datacenter and high-performance computing applications. This requires a waveguide signaling system that maximizes achievable bandwidth density while minimizing power consumption and latency as waveguide dispersion can severely limit the achievable data rate and, thus, throughput.

Some current systems use direct or superheterodyne upconversion with dual-sideband (DSB) modulation. However, the carrier suppression effect (due to waveguide group dispersion over relatively long propagation lengths and spectral folding upon downconversion at DC) limits achievable data rates due to destructive interference of the sidebands upon demodulation. Other systems may use purely dielectric waveguides that exhibit lower dispersion. However, these systems can have radiation losses at bends and discontinuities in addition to crosstalk in bundles of waveguides. Other systems may use suppression of the upper sideband by the frequency response of a waveguide launcher. However, these systems are limited to utilizing a single lower sideband.

In an illustrative example of a direct upconversion with DSB modulation at a TX, a message m(t) to be transmitted over a waveguide interconnect is generated by multiplying signal s(t) with the output of a local oscillator (LO) of amplitude $V_c$ and angular frequency $\omega_c$ where t is time. An example for a sinusoidal signal with amplitude $V_s$ and angular frequency $\omega_s$ is as follows:

$$m(t) = (V_s \cos\omega_s t)(V_c \cos\omega_c t) = \frac{V_s V_c}{2}[\cos(\omega_c + \omega_s)t + \cos(\omega_c - \omega_s)t]$$

The example sinusoidal signal illustrates the existence of two sidebands around the carrier frequency $\omega_c$. In PSK, such as coherent binary PSK (BPSK), the received signal is downconverted and demodulated by again multiplying it with the output of an LO of angular frequency near $\omega_c$.

The DSB signaling scheme leads to the superposition of the upper sideband and a flipped copy of the lower sideband in the baseband at the RX. In the presence of significant group dispersion on the waveguide channel, for example after propagation over a waveguide of 2-meter length with suitable waveguide launchers at both ends, the two sidebands exhibit differing phases at the RX, leading to a destructive interference effect displayed in the lowpass transfer function. A similar phenomenon is known as the carrier suppression effect. The existence of discrete nulls in the lowpass transfer function limits the achievable data rate to single-digit gigabits per second (Gb/s). This situation does not improve when adding equalization such as a CTLE, FFE, or DFE. Therefore, what is needed is a system, method, apparatus, etc. to overcome some of the deficiencies of current systems that use a DSB signaling scheme. More specifically, what is needed is a system, method, apparatus, etc. to enable an SSB transmission over a waveguide.

A system to enable an SSB mm wave transmission over a waveguide, as outlined herein, can resolve these issues (and others). For example, embodiments herein may be configured for use of SSB modulation to avoid the carrier suppression effect, use of low-pass filtering in the baseband at the TX or RX to limit dispersion induced sub-unit-interval (sub-UI) ripples and allow equalization to be effective, use of higher-order modulation, (e.g., PAM such as four-level PAM (PAM4)), and use of multiple carriers to maximize the overall throughput for the waveguide interconnect. System 100 can help to mitigate waveguide dispersion allowing the system to increase the data rate. Increasing the data rate for individual carriers can help to maximize the overall throughput at relatively low power consumption with fewer components such as oscillators and filters.

In an example, the SSB mm wave transmission can be achieved by utilizing a broadband ninety-degree (90°) phase shifter operating on the baseband data. The phase shifted baseband data can be summed with the original baseband data stream and upconverted at the TX, resulting in an SSB signal with a mm-wave or THz spectrum. The RX for downconverting and demodulating received SSB transmissions can be the same as for DSB but there will be no spectral folding (i.e., one sideband is suppressed at the TX) arising upon RX downconversion to the baseband near DC.

The SSB mm wave transmission can be instrumental in avoiding the detrimental carrier suppression effect in the presence of significant waveguide dispersion. Even though SSB circumvents the carrier suppression effect, channel group dispersion may still degrade the achievable data rate by causing intersymbol interference (ISI). However, equalization, such as the introduction of a CTLE, FFE, DFE, or a combination thereof, can be effective in improving the throughput. Furthermore, reducing TX edge rate using slew rate control or introducing a lowpass filter in the baseband at the TX or RX can suppress sub-UI ripples in the channel pulse response, again caused by significant channel group dispersion. In the TX case this may also be referred to as pulse shaping. The lowpass filtering at the TX or RX, instead of or in addition to using dedicated filters, could also be provided by propagating through a lossy channel or standard electrical interconnect such as one designed for Peripheral Component Interconnect Express (PCIe), QuickPath Interconnect (QPI), UltraPath Interconnect (UPI), etc.

Extending throughput can be further achieved by introducing higher-order modulation such as PAM4, which can be readily combined with SSB by modifying the baseband driver to output four signal levels instead of two as for non-return-to-zero (NRZ) signaling and by feeding the PAM4 signal into, for example, a Hilbert quadrature modulator. If the signal-to-noise ratio at the RX allows it, extension to PAM8 or even PAM16 may be possible but there is a tradeoff in terms of achievable communication distance. Optionally, FEC may be added for decreasing achieved bit error ratio (BER) levels. Other modulation techniques such as quadrature PSK (QPSK) and quadrature amplitude modulation (QAM) can be utilized as well.

FDM can be used to maximize the overall waveguide throughput by using multiple sub-bands across the available single-mode bandwidth of the waveguide. A multiplexer such as a diplexer, triplexer, or a combination thereof can be used to funnel the outputs of the modulators operating at the different carrier/LO frequencies into a single waveguide channel. Similar filters can be used to separate the signals at the RX. Depending on system requirements, instead of multiplexers, simpler RF combiners and splitters may be used as well. System 100 can also be configured to apply to frontend architectures that employ an intermediate frequency (IF) (e.g., a superheterodyne TX and/or RX). For example, filtering out an undesired sideband after DSB modulation to generate an SSB signal may be easier at IF rather than RF, at the expense of complexity and possibly limited IF bandwidth.

Elements of FIG. 1 may be coupled to one another through one or more interfaces employing any suitable connections (wired or wireless), which provide viable pathways for network (e.g., network 104, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

Turning to the infrastructure of FIG. 1, system 100 in accordance with an example embodiment is shown. Generally, system 100 may be implemented in any type or topology of networks. Network 104 represents a series of points or nodes of interconnected communication paths for receiving and transmitting packets of information that propagate through system 100. Network 104 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Message Passing Interface (MPI), Open Systems Interconnection (OSI) model, or any derivations or variants thereof (e.g., Transmission Control Protocol/Internet Protocol (TCP/IP), User Datagram Protocol/IP (UDP/IP)). Messages through the network could be made in accordance with various network protocols, (e.g., Ethernet, MPI, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, network elements 102a-102d, are meant to encompass network elements, network appliances, servers, routers, switches, gateways, bridges, load balancers, processors, memory and memory controllers, graphic processing cards, ASIC computing units, modules, or any other suitable device, component, element, or object operable to exchange information in a network environment. Network elements 102a-102d may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 102a-102d may be virtual or include virtual elements.

Figure 2:
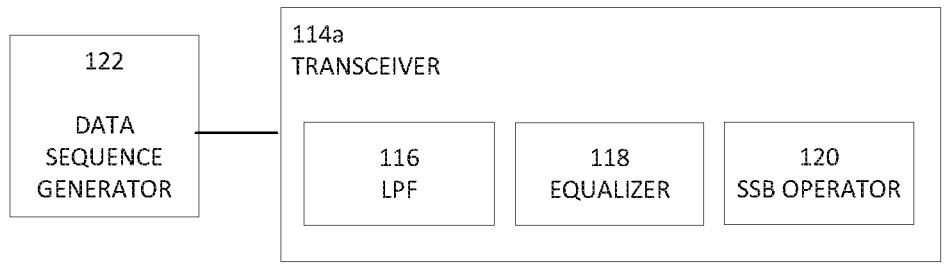
FIG. 2 illustrates an example portion of a system that may use a single side band transmission over a waveguide, in accordance with various embodiments.

Turning to FIG. 2, FIG. 2 is a simplified block diagram of an example of a transceiver 114a on a transmit side for use in system 100. Transceiver 114a can include an LPF 116, an equalizer 118, and an SSB operator block 120. Transceiver 114a can receive a signal from the data digital sequence generator 122, pass the signal through an LPF, perform equalization (i.e., pre-distortion) on the signal, convert the signal into an SSB signal and communicate the SSB mm wave signal to waveguide interconnect 168 (illustrated in FIG. 1) for communication on a waveguide.

More specifically, SSB operator block 120 can receive a signal from a digital sequence generator 122. Digital sequence generator 122 is a digital logic circuit that is configured to produce a prescribed sequence of outputs where each output can be a number of symbols or of binary or q-ary logic levels. The digital signal is communicated through appropriate routing to the input of the LPF 116. LPF 116 can be a Butterworth LPF, an elliptic LPF, or some other lowpass filter configured to convert the received digital signal to a signal with frequencies lower than a selected cutoff frequency and attenuate signals with frequencies higher than the cutoff frequency. LPF 116 can convert the signal using a lowpass filter, pulse shaping and/or slew rate control, propagation through a length of lossy channel or standard electrical interconnect (e.g., a single-ended interconnect, a differential interconnect, a microstrip, a strip line, a co-planar waveguide, etc.). Equalizer 118 can be configured to adjust the balance between frequency components within the signal. Equalizer 118 may be a finite impulse response (FIR) equalizer, a continuous-time linear equalizer (CLTE), a feed-forward equalizer (FFE), a decision feedback equalizer (DFE), etc. The equalized (i.e., pre-distorted) signal is communicated to the input of SSB operator block 120. SSB operator block 120 can be configured to generate an SSB modulated signal and communicate the SSB modulated signal to waveguide interconnect 168 (illustrated in FIG. 1) for communication on a waveguide. Waveguide interconnect 168 may include a waveguide signal launcher such as a patch launcher, a dipole launcher, a tapered-slot launcher, etc. that will receive the signal from SSB operator block 120 and communicate on an appropriate waveguide channel. Waveguide interconnect 168 may also include RF filtering structures.

Figure 3:
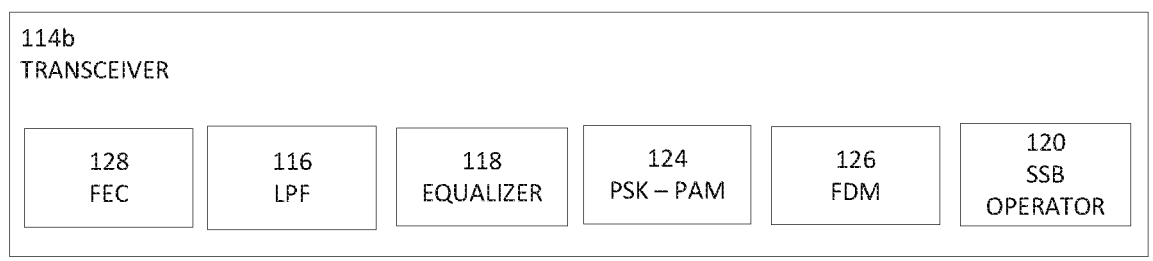
FIG. 3 illustrates an example portion of a system that may use a single side band transmission over a waveguide, in accordance with various embodiments.

Turning to FIG. 3, FIG. 3 is a simplified block diagram of an example of a transceiver 114b for use in system 100. Transceiver 114b can include forward error correction (FEC) 128, LPF 116, equalizer 118, a phase shift keying-phase amplitude modulator (PSK-PAM) 124, a frequency division multiplexer (FDM) 126, and SSB operator block 120.

FEC 128 can be configured to control errors in the SSB transmission. In some examples, such as where the signal to noise ratio (SNR) of the link is high enough the FEC is not needed and the transceiver does not include FEC 128. FEC 128 can be configured to receive digital data from a digital sequence generator 122 (illustrated in FIG. 1), append error correcting bits to the stream and communicate the resulting digital stream to the LPF 116. LPF 116 can be a Butterworth LPF, an elliptic LPF or some other lowpass filter configured to convert the received digital signal to a signal with a frequency content lower than a selected cutoff frequency and attenuate signals with frequencies higher than the cutoff frequency. LPF 116 can convert the signal using a lowpass filter, pulse shaping and/or slew rate control, propagation through a length of lossy channel or standard electrical interconnect (e.g., a single-ended interconnect, a differential interconnect, a microstrip, a strip line, a co-planar waveguide, etc.). Equalizer 118 can be configured to adjust the balance between frequency components within the signal. Equalizer 118 may be a FIR equalizer, a continuous-time linear equalizer (CLTE), a feed-forward equalizer (FFE), a decision feedback equalizer (DFE), etc. The equalized (i.e., pre-distorted) signal is communicated to the input of the PSK-PAM 124. PSK-PAM 124 can be configured to convey data by changing, or modulating, both the amplitude and the phase of a reference signal (e.g., a carrier wave). FDM 126 can be configured to divide the available bandwidth into a series of non-overlapping frequency bands, each of which is used to carry a separate signal, and allow multiple independent signals. SSB operator block 120 can be configured to generate an SSB modulated signal and communicate the SSB modulated signal to waveguide interconnect 168 (illustrated in FIG. 1) for communication on a waveguide (e.g., waveguide 170). Waveguide interconnect 168 may include a waveguide signal launcher such as a patch launcher, a dipole launcher, a tapered-slot launcher etc. that will receive the signal from SSB operator block 120 and communicate on an appropriate waveguide channel. Waveguide interconnect 168 may also include RF filtering structures.

Figure 4:
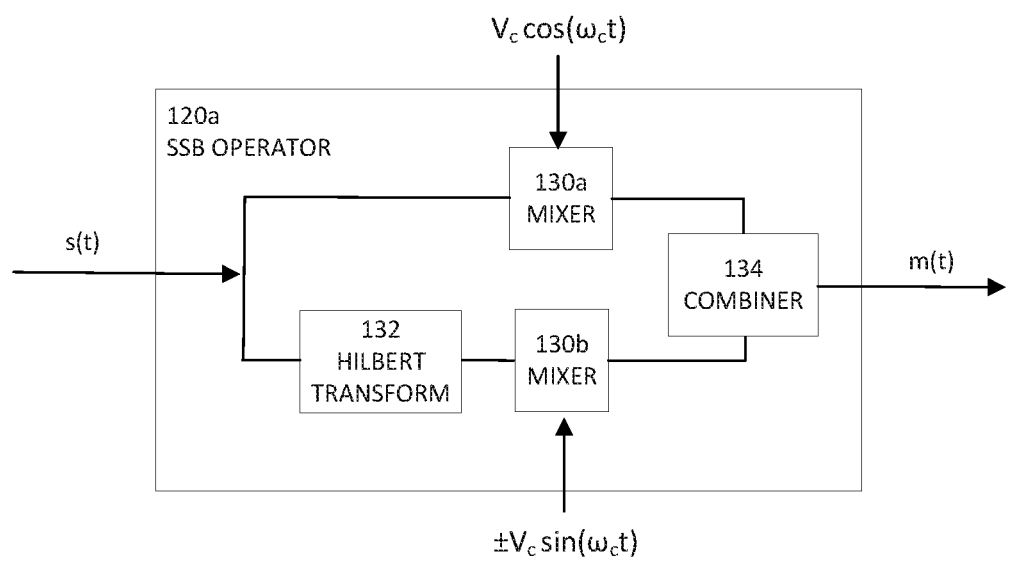
FIG. 4 illustrates an example portion of a system that may use a single side band transmission over a waveguide, in accordance with various embodiments.

Turning to FIG. 4, FIG. 4 is a simplified block diagram of an example of an SSB operator block 120a for use in system 100. As illustrated in FIG. 4, SSB operator block 120a can include mixers 130a and 130b, a Hilbert transform block 132 and a combiner 134. Hilbert transform block 132 can be configured to provide a 90-degree phase shift of the input over a frequency range, with nearly constant amplitude over the frequency range. Hilbert transform block 132 can be a broadband phase shifter, an FIR filter or other filter implementations offering a 90-degree phase shift of input over a frequency range.

In an example, an input (e.g., s(t)) can be received by mixer 130a and Hilbert transform block 132. Mixer 130a can mix the input with $V_c \cos \omega_c t$ and communicate the result to combiner 134. Hilbert transform block 132 can provide a 90-degree phase shift of the input and communicate the result to mixer 130b. Mixer 130b can mix the result of the Hilbert transform with $\pm V_c \sin \omega_c t$ and communicate the result to combiner 134. Combiner 134 can combine the results from mixers 130a and 130b and create an SSB transmission (e.g., m(t)). By selecting a plus or minus $V_c \sin$ $\omega_c t$ as the input to mixer 130b, the output will include only the lower sideband modulation if $+V_c \sin \omega_c t$ was used as input to mixer 130b or the upper sideband modulation if $-V_c \sin \omega_c t$ was used as input to mixer 130b. The other sideband of a DSB signal example is canceled when the results from mixer 130a and 130b are combined in combiner 134. In an example, to help ensure an effective sideband rejection, the input s(t) may be delayed before the operation of mixer 130a to provide the appropriate synchronization between the operations of the two mixers (mixers 130a and 130b) and allow a causal implementation of Hilbert transform block 132.

Figure 5:
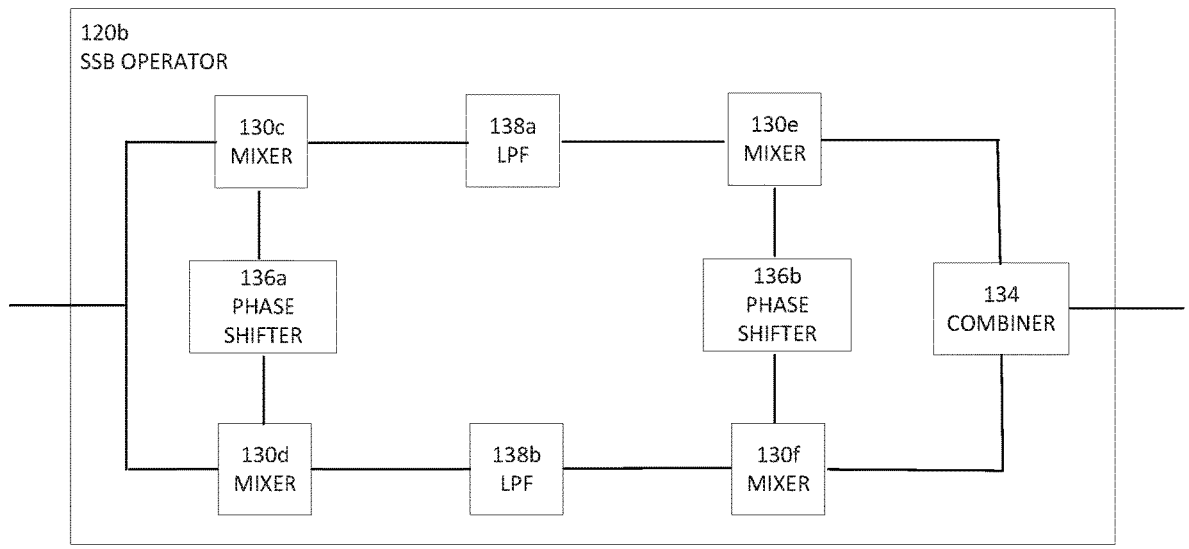
FIG. 5 illustrates an example portion of a system that may use a single side band transmission over a waveguide, in accordance with various embodiments.

Turning to FIG. 5, FIG. 5 is a simplified block diagram of an example of an SSB operator block 120b for use in system 100. As illustrated in FIG. 5, SSB operator block 120b can include mixers 130c-130f, combiner 134, phase shifters 136a and 136b and LPFs 138a and 138b. In an example, SSB operator block 120b may be similar to a Weaver SSB generator.

Generally, in some implementations, a signal received by SSB operator block 120b is first translated to be centered at zero and implemented by a quadrature pair of sine and cosine modulators. This complex signal or pair of real signals is then filtered with a lowpass filter to remove the undesired sideband that is not centered at zero. The single-sideband complex signal centered at zero is upconverted to a real signal by another pair of quadrature mixers to the desired center frequency.

More specifically, an input received by SSB operator block 120b from a digital sequence generator is communicated to mixer 130c and 130d. The input signal may optionally pass through an LPF block and equalizer block before being communicated to SSB operator block 120b. The input is upconverted to a first IF frequency using a quadrature modulator comprised of mixers 130c and 130d and local oscillator generation and phase shifter block 136a. The resulting output signals of the mixers 130c and 130d are then communicated to a lowpass filter. For example, mixer 130c can communicate an upconverted signal to LPF 138a and mixer 130d can communicate an upconverted signal to LPF 138b. After the LPFs, the signals are again further upconverted, and then combined. For example, after LPF 138a and 138b, the filtered signal can be further upconverted by mixers 130e and 130f and then communicated to combiner 134. Combiner 134 can combine the results from mixers 130e and 130f and create an SSB transmission for communication on a waveguide (e.g., waveguide 170).

Figure 6:
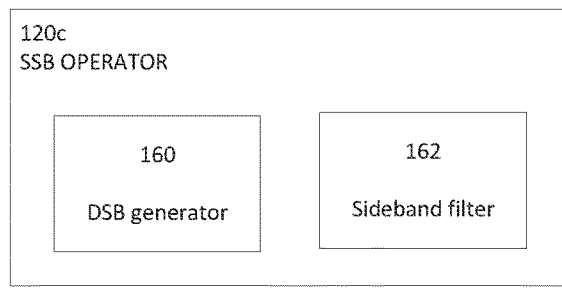
FIG. 6 illustrates an example portion of a system that may use a single side band transmission over a waveguide, in accordance with various embodiments.

Turning to FIG. 6, FIG. 6 is a simplified block diagram of an example of an SSB operator block 120c for use in system 100. As illustrated in FIG. 6, SSB operator block 120c can include a DSB generator 160 and a sideband filter 162. DSB generator 160 can generate a DSB signal and communicate the DSB signal to sideband filter 162. Sideband filter 162 can receive the signal and filter out an undesired sideband to create an SSB signal. In an example, DSB generator 160 may be a mixer-amplifier chain, may employ local oscillator generation circuits as well as phase shifter circuitry. In an example, sideband filter 162 is a passive implementation that can filter out the undesired sideband using on-die or on-package radio frequency (RF) filters. This, however, discards about 3 decibels of RF power, consumes area, and may demand RF components with relatively high quality factor (Q). Another passive implementation may be the use of RF phase shifters.

Figure 7A:
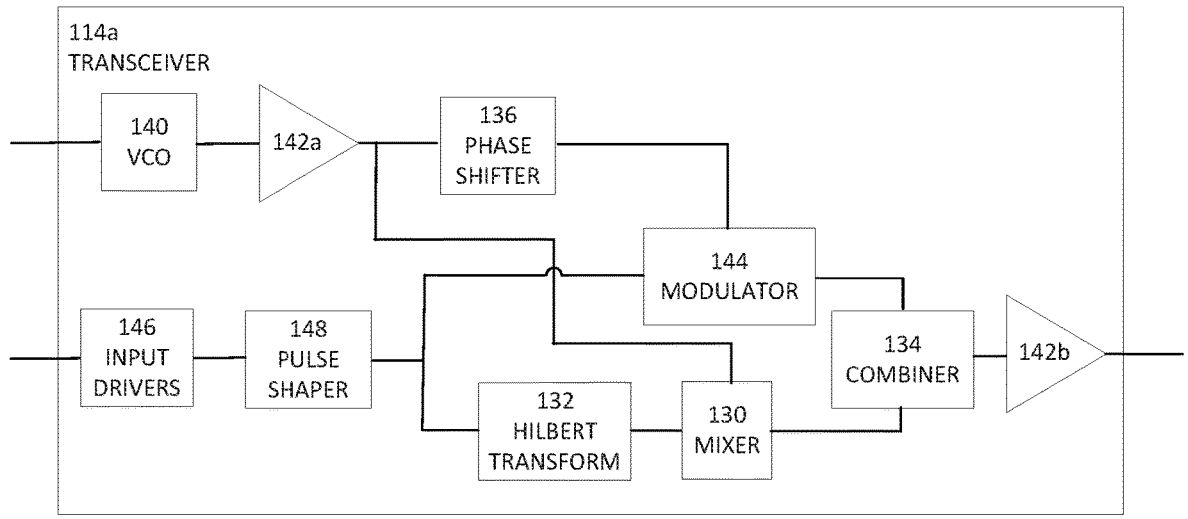
FIG. 7A illustrates an example portion of a system that may use a single side band transmission over a waveguide, in accordance with various embodiments.

Turning to FIG. 7A, FIG. 7A is a simplified block diagram of an example of a transceiver 114a for use in system 100. As illustrated in FIG. 7A, transceiver 114a can include mixer 130, Hilbert transform block 132, combiner 134, phase shifter 136, a voltage controlled oscillator (VCO) 140, frequency multiplier 142a, amplifier 142b, modulator 144, input drivers 146, and a pulse shaper 148.

Transceiver 114a receives an input signal from a data sequence generator that feeds the bit stream into the input driver 146. Input drivers 146 can be configured to receive an input signal and determine how the data in the input signal should be communicated. In an example input drivers may change the clock frequency of the incoming bitstream. Pulse shaper 148 can be configured to change the waveform of incoming pulses (e.g., limit the effective bandwidth) to make the transmitted signal better suited for transmission. Transmitting a signal at a high modulation rate through a band-limited channel can create intersymbol interference. As the modulation rate increases, the signal's bandwidth increases and when the signal's bandwidth becomes larger than the channel bandwidth, the channel starts to introduce distortion to the signal. This distortion usually manifests itself as intersymbol interference and puke shaper 148 can help avoid the intersymbol interference. Pulse shaper 148 may be a root-raised cosine filter, Gaussian filter, sinc filter, an FIR-based filter etc. VCO 140 can be an electronic oscillator whose oscillation frequency is controlled by a voltage input. The applied input voltage determines the instantaneous oscillation frequency and VCO 140 can be used for frequency modulation or phase modulation by applying a modulating signal to the control input. In an example a VCO can be a digitally controlled oscillator. Frequency multiplier 142a can multiply up the frequency of the received signal by the VCO 140. In an example frequency multiplier 142a can be a frequency tripler. Modulator 144 can be configured to varying one or more properties of a periodic waveform, (e.g., the carrier signal generated by the VCO 140 and phase shifted using the phase shifter block 136) with a modulating signal (e.g., bitstream from the output of the pulse shaper 148). Hilbert transform block 132 can perform an equal phase shift of 90 degrees to all significant frequency components of the signal spectrum. In an example, Hilbert transform block 132 may be a passive broadband phase shifter, an FIR-based Hilbert filter or a digital filter approximating the Hilbert transfer function. Mixer 130 can receive the phase shifted version of the input bitstream and upconvert it to the carrier signal generated by the VCO 140. Combiner block 134 can create a single sideband version of the upconverted signal. Amplifier 142b can increase the power of the received single sideband signal before launching the signal into the waveguide.

Figure 7B:
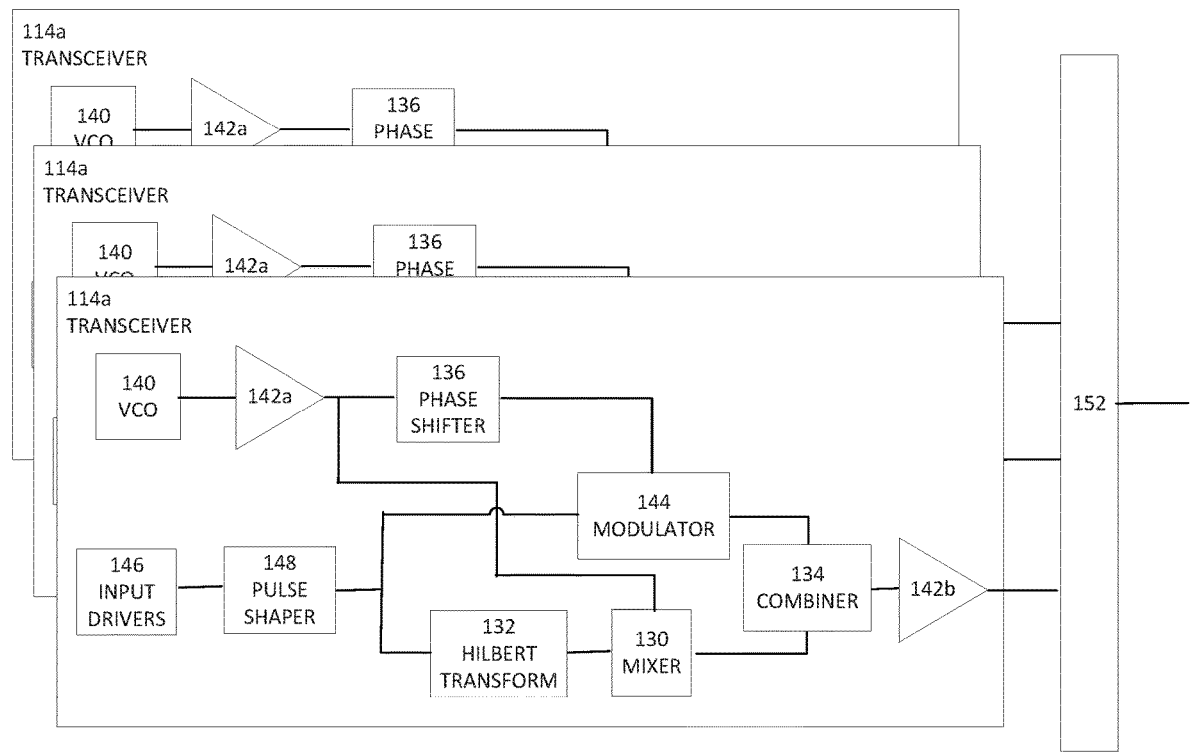
FIG. 7B illustrates an example portion of a system that may use a single side band transmission over a waveguide, in accordance with various embodiments.

Turning to FIG. 7B, FIG. 7B is a simplified block diagram of an example of a plurality of transceivers 114a for use in system 100. As illustrated in FIG. 7B, output from each of the plurality of transceivers 114a can be communicated to combiner 152. Combiner 152 can combine the output from each of the plurality of transceivers 114a into a single output and communicate the output to a waveguide launcher, a waveguide and a receiving transceiver.

Figure 8A:
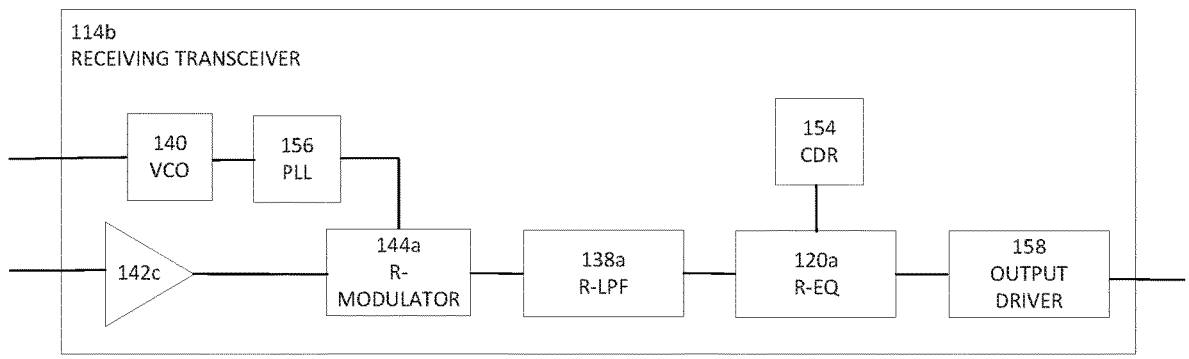
FIG. 8A illustrates an example portion of a system that may use a single side band transmission over a waveguide, in accordance with various embodiments.

Turning to FIG. 8A, FIG. 8A is a simplified block diagram of an example of a receiving transceiver 114b for use in system 100. As illustrated in FIG. 8A, receiving transceiver 114b can include a receiving equalizer 118a, a receiving LPF 138a, a receiving amplifier 142c, a receiving modulator 144a, clock and data recovery (CDR) 154, phase lock loop (PLL) 156, VCO 140, and an output driver 158.

CDR 154 can be configured to extract timing information from a serial data stream to allow the receiving circuit to decode the transmitted symbols. CDR 154 can generate a clock from an approximate frequency reference and then phase-align the clock to the transitions in the data stream with PLL 156. PLL 156 can be configured to generate an output signal whose phase is related to the phase of an input signal to demodulate the signal, recover a signal from a noisy communication channel, generate a stable frequency at multiples of an input frequency (frequency synthesis), etc. Output driver 158 can configure the signal for output and communication to a digital data sink such as a memory controller, a processor, or a network controller.

Figure 8B:
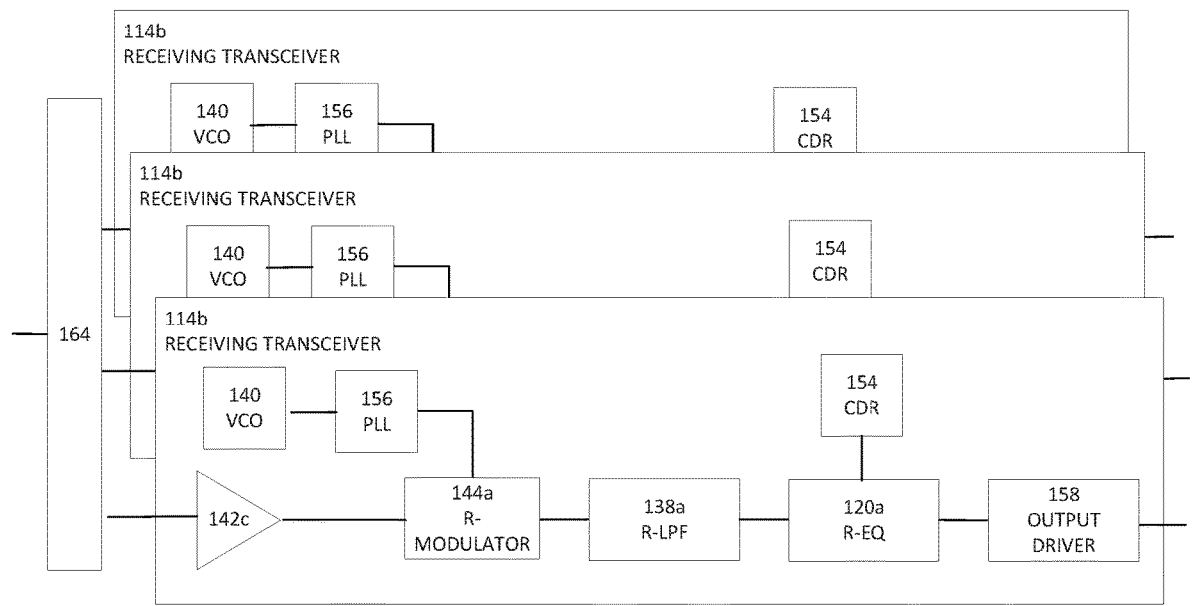
FIG. 8B illustrates an example portion of a system that may use a single side band transmission over a waveguide, in accordance with various embodiments.

Turning to FIG. 8B, FIG. 8B is a simplified block diagram of an example of a plurality of receiving transceivers 114b for use in system 100. As illustrated in FIG. 8B, a single sideband signal (e.g., output from each of the plurality of transceivers 114a communicated by combiner 152 shown in FIG. 7B) can be received by splitter 164. Splitter 164 can split the signal and communicate the output to one or more receiving transceivers 114b. In an example splitter 164 may be a frequency dependent splitter (e.g. diplexer, triplexer etc.)

Figure 9:
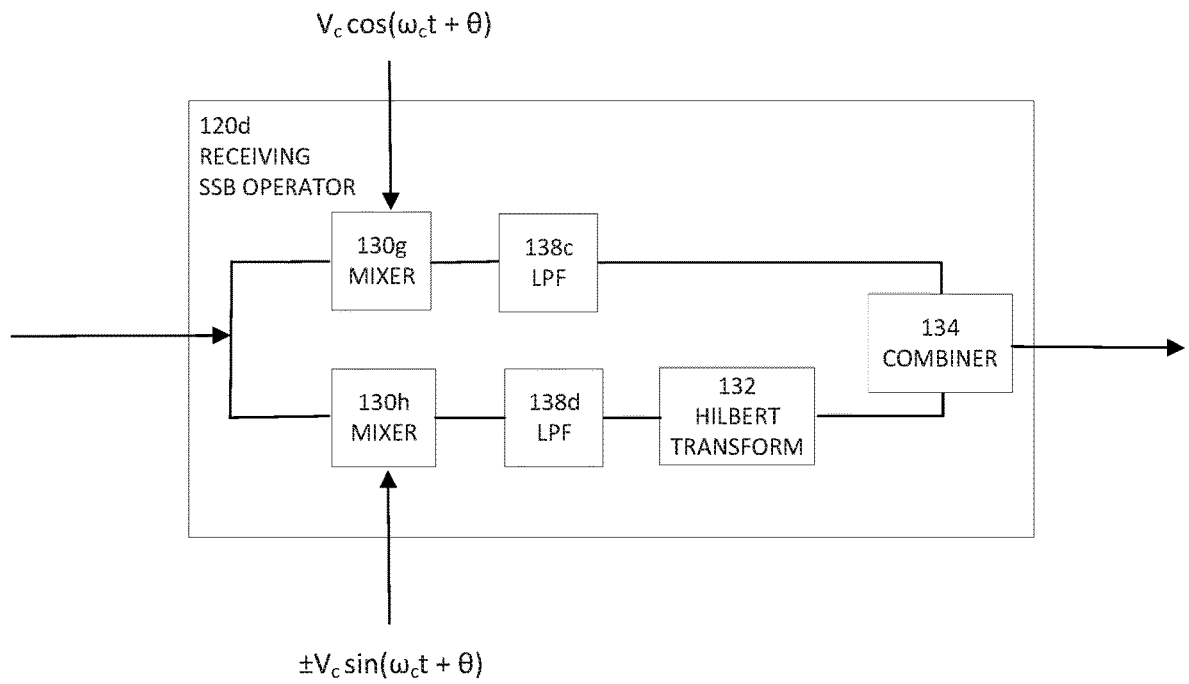
FIG. 9 illustrates an example portion of a system that may convert a signal communicated over a waveguide into a single side band transmission, in accordance with various embodiments.

Turning to FIG. 9, FIG. 9 is a simplified block diagram of an example of a receiving SSB operator block 120d for use in system 100. As illustrated in FIG. 9, receiving SSB operator block 120d can include mixers 130g and 130h, LPFs 138c and 138d, Hilbert transform block 132 and combiner 134. Hilbert transform block 132 can be a broadband phase shifter, an FIR filter or other filter implementations offering a 90-degree phase shift of input over a frequency range.

In an example, system 100 can include a bidirectional interface where all Hilbert engines (or other similar implementations offering a 90-degree phase shift of input over a frequency range) are at one end of an interface. More specifically, receiving SSB operator block 120d can receive DSB input from a radio frequency channel (e.g., waveguide 170). The DSB input can be communicated to mixer 130g and 130h. Mixer 130g can mix the input with $V_c \cos(\omega_c t+\theta)$ where $\theta$ is a suitable phase shift and communicate the mixed result to LPF 138c. LPF 138c can communicate the low pass filtered result to combiner 134. Mixer 130h can mix the input with $\pm V_c \sin(\omega_c t+\theta)$ and communicate the result to LPF 138d. LPF 138d can communicate the low-pass filtered result to Hilbert transform block 132. Hilbert transform block 132 can provide a 90-degree phase shift of the low pass filtered result from LPF 138d and communicate the result to combiner 134. Combiner 134 can combine the results from LPF 138c and Hilbert transform block 132 to create an SSB transmission. By selecting a plus or minus $V_c \sin(\omega_c t+\theta)$ as the input to mixer 130h, the output of combiner 134 will include only the lower sideband modulation if $+V_c \sin(\omega_c t+\theta)$ was used as input to mixer 130h or the upper sideband modulation if $-V_c \sin(\omega_c t+\theta)$ was used as input to mixer 130h. In an example, to help ensure an effective sideband rejection, the output of LPF 138c may be delayed to allow a causal implementation of Hilbert transform block 132.

Figure 10:
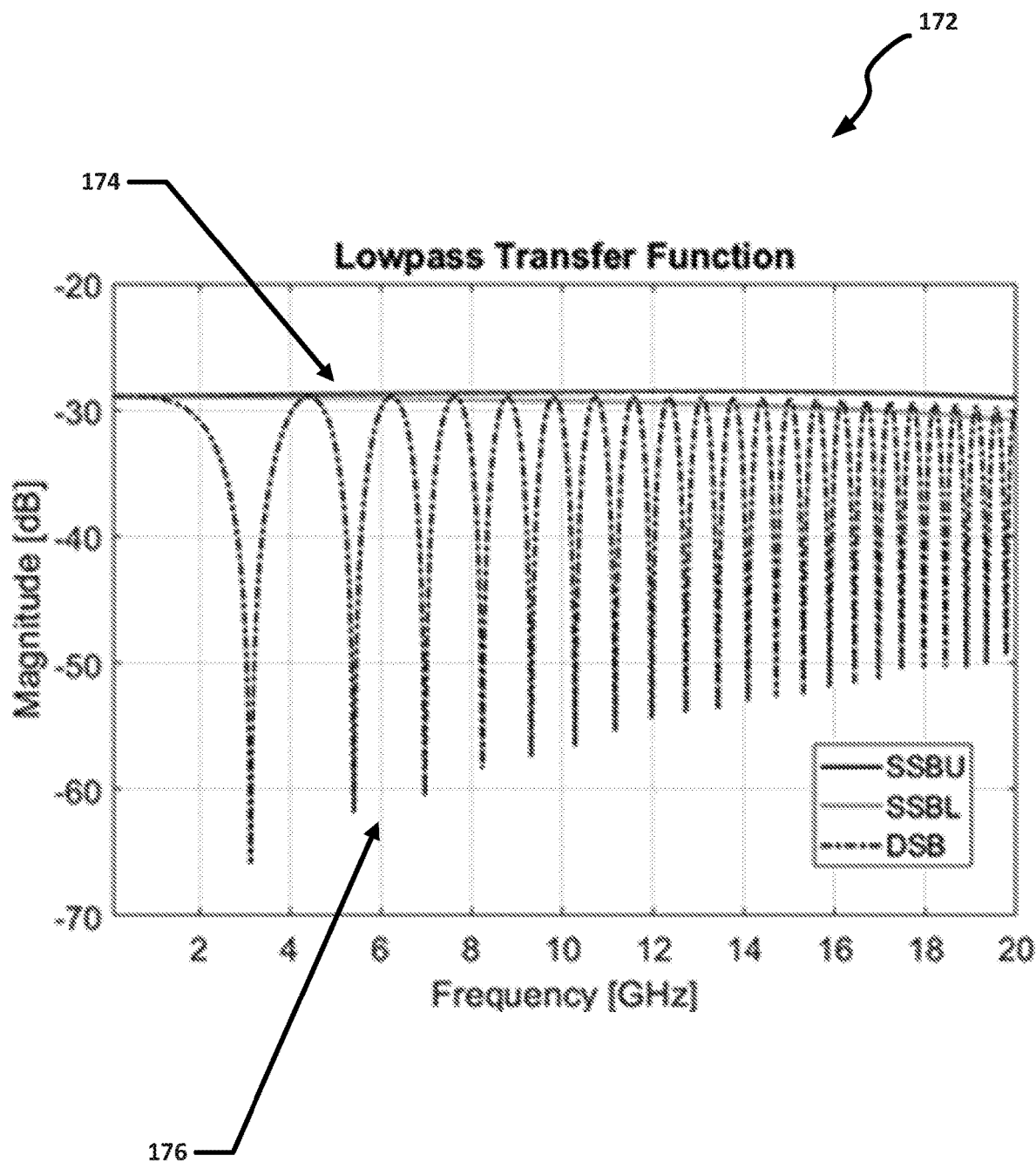
FIG. 10 is a graph illustrating example details of a system that may use a single side band transmission over a waveguide, in accordance with various embodiments.

Turning to FIG. 10, FIG. 10 is a simplified graph 172 illustrating example details of a transfer function of a dispersive waveguide channel utilizing SSB signal transmission 174 versus utilizing DSB signal transmission 176. As illustrated in graph 172, when employing DSB signal transmission 176 the transfer function includes nulls which indicate the carrier suppression effect. When an SSB signal transmission 174 is employed, the transfer function remains relatively flat across the whole bandwidth, which enables a very high link capacity.

It is to be understood that other embodiments may be utilized and structural changes may be made without departing from the scope of the present disclosure. Substantial flexibility is provided by system 100 in that any suitable arrangements and configuration may be provided without departing from the teachings of the present disclosure. Elements of FIG. 1 may be coupled to one another through one or more interfaces employing any suitable connections (wired or wireless), which provide viable pathways for network (e.g., network 104, etc.) communications. Additionally, any one or more of these elements of FIG. 1 may be combined, reordered (e.g., SSB operator block 120 illustrated in FIG. 3 can be after equalizer 118 or can be after FDM 126 as shown in FIG. 3), and/or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

OTHER NOTES AND EXAMPLES

In Example A1, an interconnect can include a transceiver, where the transceiver is to generate a single side band (SSB) millimeter (mm) wave signal for communication over a dielectric waveguide and a waveguide interconnect to communicate the SSB mm wave signal over the dielectric waveguide.

In Example, A2, the subject matter of Example A1 can optionally include an SSB operator to generate the SSB mm wave signal.

In Example A3, the subject matter of any one of Examples A1-A2 can optionally include where the SSB mm wave signal is generated by a filter implementation that generates a 90-degree phase shift of input.

In Example A4, the subject matter of any one of Examples A1-A3 can optionally include where the filter implementation is a finite-impulse response filter.

In Example A5, the subject matter of any one of Examples A1-A4 can optionally include where the SSB mm wave signal is generated by a Hilbert transform.

In Example A6, the subject matter of any one of Examples A1-A5 can optionally include where the SSB mm wave signal is generated by filtering out a sideband from a dual-sideband signal.

In Example A7, the subject matter of any one of Examples A1-A6 can optionally include a lowpass filter.

In Example A8, the subject matter of any one of Examples A1-A7 can optionally include where the lowpass filter is an elliptic filter.

In Example A9, the subject matter of any one of Examples A1-A8 can optionally include an equalizer.

In Example A10, the subject matter of any one of Examples A1-A9 can optionally include a phase shift keying-phase amplitude modulator and a frequency division multiplexer.

Example AA1 A server blade including a dielectric waveguide to propagate a signal between a first component of the server blade and a second component of the server blade, a device to generate a single side band (SSB) signal for communication over the dielectric waveguide, where the SSB signal has a frequency between 30 gigahertz (GHz) and 300 GHz, and a waveguide interconnect coupled with the device and the dielectric waveguide, where the waveguide interconnect is to receive the SSB signal from the device and transmit the SSB signal over the dielectric waveguide.

In Example AA2, the subject matter of Example AA1 can optionally include where an SSB operator generates the SSB signal.

In Example AA3, the subject matter of any one of the Examples AA1-AA2 can optionally include where the SSB signal is generated by use of a finite-impulse response filter.

In Example AA4, the subject matter of any one of the Examples AA1-AA3 can optionally include a lowpass filter.

In Example AA5, the subject matter of any one of the Examples AA1-AA4 can optionally include where the lowpass filter is an elliptic filter.

In Example AA6, the subject matter of any one of the Examples AA1-AA5 can optionally include an equalizer, a phase shift keying-phase amplitude modulator, and a frequency division multiplexer.

Example S1 is a system for enabling a single side band (SSB) transmission over a waveguide, the system including a transceiver, where the transceiver is configured to generate an SSB signal for communication over the waveguide and a waveguide interconnect coupled with the transceiver, where the waveguide interconnect is to communicate the SSB signal over the waveguide to a receiver.

In Example S2, the subject matter of Example S1 can optionally include where the SSB signal is generated by use of a finite-impulse response filter.

In Example S3, the subject matter of any of the Examples S1-S2 can optionally include a lowpass filter.

In Example S4, the subject matter of any of the Examples S1-S3 can optionally include an equalizer, a phase shift keying-phase amplitude modulator, and a frequency division multiplexer.

Example S1 is a system for enabling a single side band (SSB) transmission over a waveguide, the system including a transceiver, where the transceiver is configured to generate an SSB signal for communication over the waveguide and a waveguide interconnect coupled with the transceiver, where the waveguide interconnect is to communicate the SSB signal over the waveguide to a receiver.

In Example S2, the subject matter of Example S1 can optionally include where the SSB signal is generated by use of a finite-impulse response filter.

In Example S3, the subject matter of any of the Examples S1-S2 can optionally include a lowpass filter.

In Example S4, the subject matter of any of the Examples S1-S3 can optionally include an equalizer, a phase shift keying-phase amplitude modulator, and a frequency division multiplexer.

Example SS1 is a system for enabling a single side band (SSB) transmission over a waveguide, the system including means for generating an SSB signal for communication over a waveguide and a waveguide interconnect coupled with the transceiver, and means for communicating the SSB signal over the waveguide to a receiver.

In Example SS2, the subject matter of Example SS1 can optionally include where the SSB signal is generated by use of a finite-impulse response filter.

In Example SS3, the subject matter of any of the Examples SS1-SS2 can optionally include a lowpass filter.

In Example SS4, the subject matter of any of the Examples SS1-SS3 can optionally include an equalizer, a phase shift keying-phase amplitude modulator, and a frequency division multiplexer Example X1 is a machine-readable storage medium including machine-readable instructions to implement a method or realize an apparatus as in any one of the Examples A1-A10 or AA1-AA6. Example Y1 is an apparatus comprising means for performing the method. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An interconnect comprising:
   a transceiver, wherein the transceiver includes a single side band operator block to convert a received signal into two intermediate frequency signals that are filtered, upconverted, and combined to generate a single side band (SSB) millimeter (mm) wave signal for communication over a dielectric waveguide from a first server to a second server, wherein the SSB signal has a frequency between 30 gigahertz (GHz) and 300 GHz; and
   a waveguide interconnect that includes a waveguide signal launcher, the waveguide interconnect to communicate the SSB mm wave signal over the dielectric waveguide, wherein the waveguide interconnect is to receive the SSB signal from the transceiver and transmit the SSB signal over the dielectric waveguide.

2. The interconnect of claim 1, wherein the transceiver further comprises:
   a lowpass filter, wherein the lowpass filter is an elliptic filter.

3. The interconnect of claim 1, wherein the transceiver further comprises:
   an equalizer.

4. The interconnect of claim 1, wherein the transceiver further comprises:
   a phase shift keying-phase amplitude modulator; and
   a frequency division multiplexer.

5. The interconnect of claim 1, wherein the single sideband operator includes a first stage having a first plurality of mixers and a second stage having a second plurality of mixers.

6. The interconnect of claim 1, wherein the single side band operator block converts the received signal into the two intermediate frequency signals using a first phase shifter, filters the two intermediate frequency signals using a low pass filter, upconverts the two filtered intermediate frequency signals using a second phase shifter, and combines the two upconverted filtered intermediate frequency signals to generate the SSB signal.

7. The interconnect of claim 1, wherein the received signal is converted into the intermediate frequency signals using a quadrature modulation.

8. The interconnect of claim 1, wherein the received signal is centered and a quadrature pair of sine and cosine modulators are used to create the intermediate frequency signals.

9. The interconnect of claim 8, wherein each of the filtered intermediate frequency signals are upconverted to a real signal by a quadrature mixer before being combined to generate the SSB signal.

10. A server blade comprising:
   a dielectric waveguide to propagate a signal between a first component of the server blade and a second component of the server blade;
   a device to generate a single side band (SSB) signal for communication over the dielectric waveguide, wherein the device includes a single side band operator block to convert a received signal into two intermediate frequency signals that are filtered, upconverted, and combined to generate the SSB signal, wherein the SSB signal has a frequency between 30 gigahertz (GHz) and 300 GHz; and
   a waveguide interconnect coupled with the device and the dielectric waveguide, wherein the waveguide interconnect includes a waveguide signal launcher and is to receive the SSB signal from the device and transmit the SSB signal over the dielectric waveguide.

11. The server blade of claim 10, wherein the device further comprises:
   a lowpass filter.

12. The server blade of claim 10, wherein the device further comprises:
   an equalizer;
   a phase shift keying-phase amplitude modulator; and
   a frequency division multiplexer.

13. A system for enabling a single side band (SSB) transmission from a first server to a second server over a waveguide comprising:
   a transceiver located in the first server, wherein the transceiver includes a single side band operator block to convert a received signal into two intermediate frequency signals that are filtered, upconverted, and combined to generate an SSB signal for communication over the waveguide, wherein the SSB signal has a frequency between 30 gigahertz (GHz) and 300 GHz; and
   a waveguide interconnect coupled with the transceiver, wherein the waveguide interconnect includes a waveguide signal launcher, wherein the waveguide interconnect is to receive the SSB signal from the transceiver and communicate the SSB signal over the waveguide to a receiver in the second server.

14. The system of claim 13, wherein the transceiver further comprises:
   an equalizer;
   a phase shift keying-phase amplitude modulator; and
   a frequency division multiplexer.

* * * * *